United States Patent
de Jong

(10) Patent No.: US 7,281,237 B2
(45) Date of Patent: Oct. 9, 2007

(54) RUN-TIME VERIFICATION OF ANNOTATED SOFTWARE CODE

(75) Inventor: Eduard K. de Jong, Bristol (GB)

(73) Assignee: Sun Microsystems, Inc., Santa Clara, CA (US)

( * ) Notice: Subject to any disclaimer, the term of this patent is extended or adjusted under 35 U.S.C. 154(b) by 514 days.

(21) Appl. No.: 10/346,583

(22) Filed: Jan. 16, 2003

(65) Prior Publication Data

US 2004/0143814 A1 Jul. 22, 2004

(51) Int. Cl.
*G06F 9/45* (2006.01)

(52) U.S. Cl. .................................... 717/126
(58) Field of Classification Search ................ 717/126
See application file for complete search history.

(56) References Cited

U.S. PATENT DOCUMENTS

| | | | |
|---|---|---|---|
| 5,490,249 A | 2/1996 | Miller | |
| 5,652,835 A | 7/1997 | Miller | |
| 5,659,754 A | 8/1997 | Grove et al. | |
| 5,668,999 A | 9/1997 | Gosling | |
| 5,740,441 A | 4/1998 | Yellin et al. | |
| 5,748,964 A | 5/1998 | Gosling | |
| 5,887,161 A | 3/1999 | Cheong et al. | |
| 5,999,731 A | 12/1999 | Yellin et al. | |
| 5,999,732 A | 12/1999 | Bak et al. | |
| 6,038,378 A * | 3/2000 | Kita et al. | 714/38 |
| 6,063,132 A | 5/2000 | DeCamp et al. | |
| 6,092,147 A | 7/2000 | Levy et al. | 711/6 |
| 6,466,947 B2 | 10/2002 | Arnold et al. | |
| 6,477,702 B1 | 11/2002 | Yellin et al. | 717/126 |
| 6,959,432 B2 * | 10/2005 | Crocker | 717/126 |
| 6,996,802 B2 * | 2/2006 | de Jong | 717/107 |
| 2002/0093856 A1* | 7/2002 | Baentsch et al. | 365/20 |

FOREIGN PATENT DOCUMENTS

| | | |
|---|---|---|
| EP | 0 605 872 A1 | 12/1993 |
| EP | 0 751 458 A1 | 5/1996 |
| EP | 0 821 305 A2 | 7/1997 |
| WO | 00/00890 | 1/2000 |

OTHER PUBLICATIONS

David Basin et al., "*Java Bytecode Verification by Model Checking*", pp. 491-494.

(Continued)

*Primary Examiner*—John Chavis
(74) *Attorney, Agent, or Firm*—Gunnison, McKay & Hodgson, L.L.P.; Forrest Gunnison

(57) ABSTRACT

Verification of a software program may be automated by receiving a program source file comprising program source code and at least one formal specification annotation, extracting the at least one formal specification annotation from the program source file, compiling the program source code and linking the compiled program and the at least one extracted formal specification annotation to create an executable program that includes at least one reference to an executable formal specification module. According to one aspect, a virtual machine includes a target virtual machine for executing one or more program implementation instructions, and a formal virtual machine for executing one or more formal specification modules corresponding to one or more program implementation instructions and configured to call a formal specification module, and to compare a first result obtained by executing the program implementation instructions with a second result obtained by the call to the formal specification module.

51 Claims, 16 Drawing Sheets

OTHER PUBLICATIONS

Joachim Posegga et al., "*Byte Code Verification for Java Smart Cards Based on Model Checking*", Sep. 16-18, pp. 175-190.

Dean, Jeffrey, "*ProfileMe: Hardware Support for Instruction-Level Profiling on Out-of-Order Processors*", IEEE, 1997.

Zhao, Jianjun "*Applying Program Dependence Analysis to Java Software*" Fukuoka Kogyo Daigaku Kenkyu Ronshu, Research Bulletin of Fukuoka Institute of Technology, 1998, vol. 31, No. 1, pp. 29-41.

Tran, N. et al., "Common Runtime Support for Assertions", *Trusted Components Workshop Jan. 8-11, 2003*, Prato, Italy, pp. 1-5, [Online] Jan. 9, 2003. (XP002283455).

Abramson, D. et al., "Guard: A Tool for Migrating Scientific Applications to the .NET Framework", *2002 International Conference on Computational Science (ICCS 2002)*, Amsterdam, The Netherlands, pp. 834-843, [Online] Apr. 21, 2002. (XP002283456).

Abramson, D. et al., "Implementation Techniques for a Parallel Relative Debugger", *International Conference on Parallel Architectures and Compilation Techniques (PACT '96)*, Boston, Massachusetts, USA, pp. 1-9, [Online] Oct. 20-23, 1996. (XP002283457).

* cited by examiner

Class File

```
:
:
:
Descriptor (Name1, Calling Parameters, Etc.)
Code
Exception Ranges
    PC1, PC2, Exception_Type, WhatToDoPC3
:
:
:
Descriptor (Name2, Calling Parameters, Etc.)
Code
Exception Ranges
    PC1, PC2, Exception_Type, WhatToDoPC3
:
:
:
```

FIG. 2
(PRIOR ART)

RUN-TIME VERIFICATION OF ANNOTATED SOFTWARE CODE

FIELD OF THE INVENTION

The present invention relates to the field of computer science. More particularly, the present invention relates to run-time verification of software code.

BACKGROUND OF THE INVENTION

High integrity software is software that must be trusted to work dependably in some critical function, and whose failure to do so may have catastrophic results, such as serious injury, loss of life or property, business failure or breach of security. Some examples include software used in safety systems of nuclear power plants, medical devices, electronic banking, air traffic control, automated manufacturing, and military systems. The importance of high quality, low defect software is apparent in such critical situations. However, high integrity software is also important in more mundane business areas where defective software is often the norm.

Formal verification is the process of checking whether a design satisfies some requirements or properties. In order to formally verify a design, it must first be converted into a more condensed, verifiable format. The design is specified as a set of interacting systems, each having a finite number of configurations or states. States and transition between states constitute finite state machines (FSMs). The entire system is a FSM that can be obtained by composing the FSMs associated with each component. The first step in verification consists of obtaining a complete FSM description of the system. Given a present state (or current configuration), the next state (or successive configuration) of a FSM can be written as a function of its present state and inputs (transition function or transition relation). Formal verification attempts to execute every possible computational path with every possible state value to prove every possible state is consistent.

Once a formal specification has been verified, a software implementation of the formal specification is verified against the formal specification. This is typically done via visual inspection of the software implementation together with the corresponding detailed or formal specification of the software program. The formal specification and the implementation may be in separate files, or implementation source code may be interspersed with formal specification annotations corresponding to the implementation source code. Mechanisms exist to extract the annotations and verify them, as illustrated below with respect to FIG. 1A. Mechanisms also exist to extract the implementation source code and create implementation executable code, as illustrated below with respect to FIG. 1B.

Turning now to FIG. 1A, a block diagram that illustrates verification of formal specification statements extracted from a program source file is presented. A source file 100 includes implementation source code interspersed with formal specification annotations. An extractor/syntax checker receives the source file 100 and extracts the formal specification annotations to create a formal specification file 110. A verifier 115 receives the formal specification file 110 and verifies the formal specification statements to create a results file 120 including results of the verification.

Turning now to FIG. 1B, a block diagram that illustrates compiling and linking implementation source code extracted from a program source file is presented. Like source file 100 of FIG. 1A, source file 150 of FIG. 1B includes implementation source code interspersed with formal specification annotations. A compiler/linker 155 receives the source file 150, compiles the implementation source code and links the resultant object code to create to create an executable file 160 containing implementation executable code. The compiler/linker typically treats the annotations as comments and thus ignores them.

Unfortunately, the processes illustrated by FIGS. 1A and 1B are disjoint; the formal verification process illustrated by FIG. 1A proceeds without regard to the implementation source code corresponding to the annotations, and the compilation and linking process illustrated by FIG. 1B proceeds without regard to the formal specification annotations. Thus, verification of the implementation source code requires a visual inspection of the source file to confirm that the implementation source code complies with the constraints imposed by the formal specification annotations.

A virtual machine is an abstract computing machine generated by a software application or sequence of instructions that is executed by a processor. The term "architecture-neutral" refers to programs, such as those written in the Java™ programming language, which can be executed by a virtual machine on a variety of computer platforms having a variety of different computer architectures. Thus, for example, a virtual machine implemented on a Windows™-based personal computer system will execute an application using the same set of instructions as a virtual machine implemented on a UNIX™-based computer system. The result of the platform-independent coding of a virtual machine's sequence of instructions is a stream of one or more bytecodes, many of which are, for example, one-byte-long numerical codes.

The Java™ programming language is an object-oriented programming language. In an object-oriented system, a "class" describes a collection of data and methods that operate on that data. Taken together, the data and methods describe the state of and behavior of an object. Use of the Java™ programming language has found many applications including, for example, those associated with Web browsers. The Java™ programming language is described in detail in Gosling, et al., "The Java™ Language Specification", August 1996, Addison-Wesley Longman, Inc. Programs written in the Java™ language execute on a virtual machine.

A Java™ virtual machine (JVM) executes virtual machine code written in the Java™ programming language and satisfies the Java™ Virtual Machine Specification (Lindholm, et al., "The Java™ Virtual Machine Specification", April 1999, Addison-Wesley Longman, Inc., Second Edition). A Jav™ virtual machine (JVM) is an abstract computer architecture that can be implemented in hardware or software. Either implementation is intended to be included in the following description of a VM. For the purposes of this disclosure, the term "processor" may be used to refer to a physical computer or a virtual machine.

FIG. 2 is a block diagram that illustrates a Java™ class file. Methods are described via a descriptor component, a code component and one or more exception ranges. The descriptor component identifies the method name, calling parameters and other information about the method. The code component contains the executable code of the method. Each exception range associates a range of program counter values to the address of an exception handler to invoke if an exception is raised while executing code within the exception range.

A Java™ virtual machine executes programs written in the Java™ programming language and is designed for use on desktop computers, which are relatively rich in memory.

However, various devices have relatively limited architectures. Resource-constrained devices are generally considered to be those that are relatively restricted in memory and/or computing power or speed, as compared to typical desktop computers and the like. Other resource-constrained devices include, by way of example, smart cards, cellular telephones, boundary scan devices, field programmable devices, personal digital assistants (PDAs) and pagers and other miniature or small footprint devices.

Smart cards are typically made of plastic or metal and have an electronic chip that includes an embedded microprocessor or microcontroller to execute programs and memory to store programs and data. Such devices, which can be about the size of a credit card, typically have computer chips with 8-bit or 16-bit architectures. Additionally, these devices typically have limited memory capacity. For example, some smart cards have less than one kilobyte (1K) of random access memory (RAM) as well as limited read only memory (ROM), and/or non-volatile memory such as electrically erasable programmable read only memory (EEPROM).

It would be desirable to write programs that use the full implementation of the Java™ virtual machine for execution on resource-constrained devices such as smart cards. However, due to the limited architecture and memory of resource-constrained devices such as smart cards, the full Java™ virtual machine platform cannot be implemented on such devices. Accordingly, a separate Java Card™ (the smart card that supports the Java™ programming language) technology supports a subset of the Java™ programming language for resource-constrained devices. Java Card™ technology is described in Chen, Z. *Java Card™ Technology for Smart Cards—Architecture and Programmer's Guide*, Boston, Addison-Wesley, 2000.

What is needed is solution for deployment of high integrity software that simplifies program verification. A further need exists for such a solution that provides automated verification of a software program specification with a corresponding software program implementation. A further need exists for such a solution that simplifies program verification of software developed for resource constrained devices such as smart cards. Yet a further need exists for such a solution that simplifies program verification of software developed for a Java Card™ technology-enabled device.

SUMMARY OF THE INVENTION

Verification of a software program may be automated by receiving a program source file comprising program source code and at least one formal specification annotation, extracting the at least one formal specification annotation from the program source file, compiling the program source code and linking the compiled program and the at least one extracted formal specification annotation to create an executable program that includes at least one reference to an executable formal specification module. According to one aspect, a virtual machine includes a target virtual machine for executing one or more program implementation instructions, and a formal virtual machine for executing one or more formal specification modules corresponding to one or more program implementation instructions and configured to call a formal specification module, and to compare a first result obtained by executing the program implementation instructions with a second result obtained by the call to the formal specification module.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 2 is a block diagram that illustrates a Java™ class file.

DETAILED DESCRIPTION

Figure 1A:
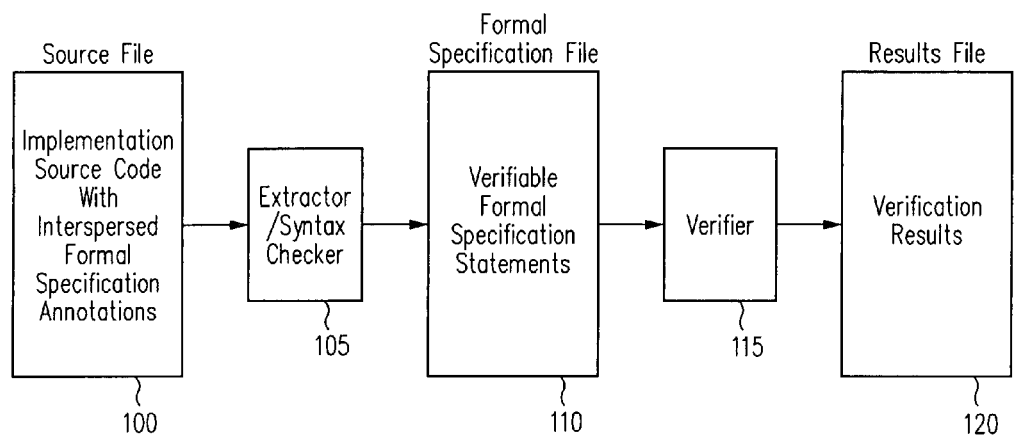
FIG. 1A is a block diagram that illustrates verification of formal specification statements extracted from a program source file.
Figure 1B:
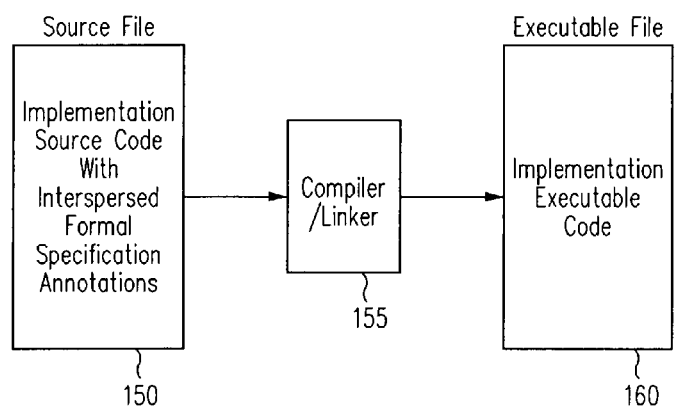
FIG. 1B is a block diagram that illustrates compiling and linking implementation source code extracted from a program source file.

Embodiments of the present invention are described herein in the context of run-time verification of software code. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available from Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "conformance instruction" is defined as any instruction whose placement in a sequence of program implementation instructions indicates one or more result from executing program implementation instructions should be compared with the result of executing an executable formal specification module associated with the conformance instruction.

Figure 3:
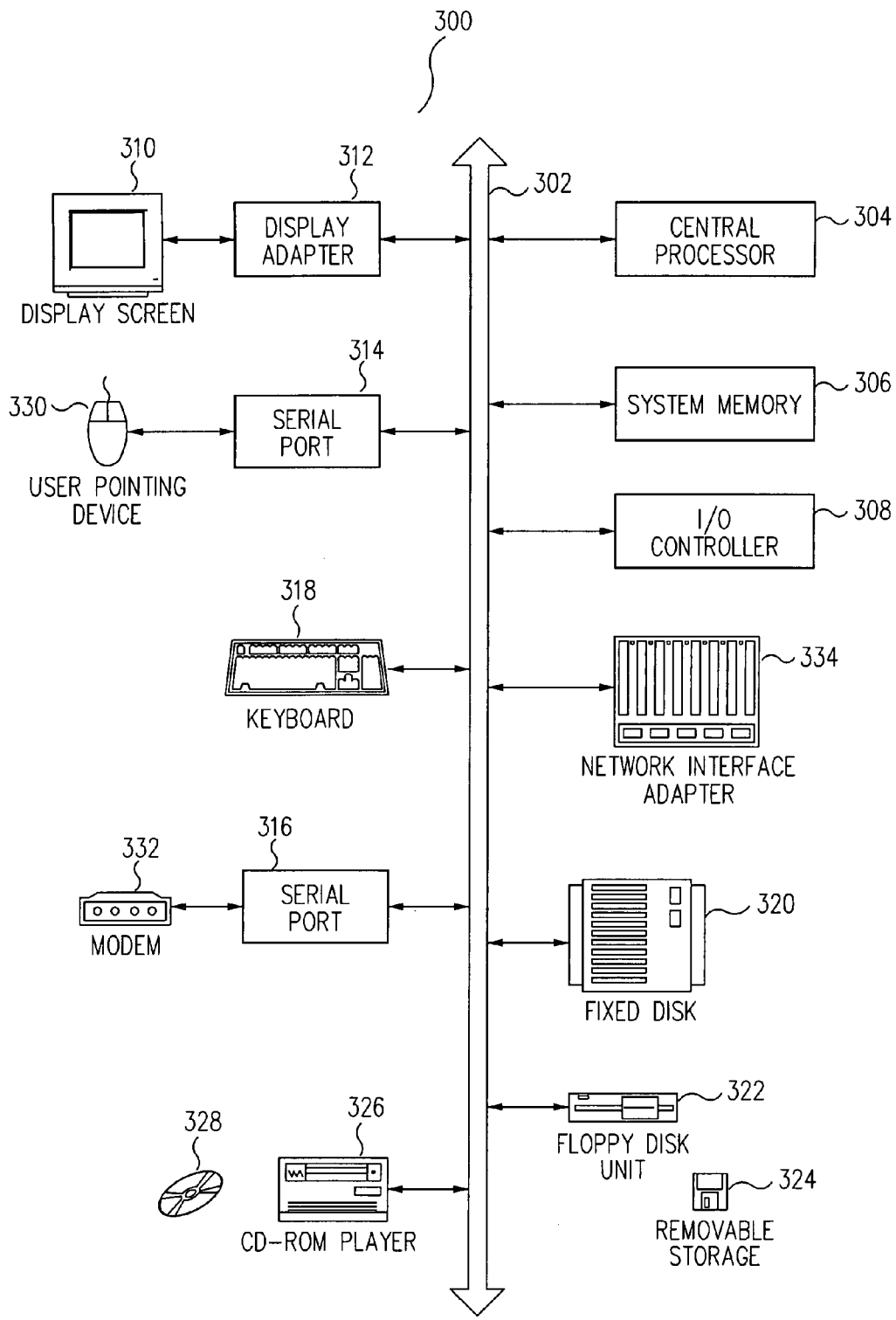
FIG. 3 is a block diagram of a computer system suitable for implementing aspects of the present invention.

FIG. 3 depicts a block diagram of a computer system 300 suitable for implementing aspects of the present invention. As shown in FIG. 3, computer system 300 includes a bus 302 which interconnects major subsystems such as a central processor 304, a system memory 306 (typically RAM), an input/output (I/O) controller 308, an external device such as a display screen 310 via display adapter 312, serial ports 314 and 316, a keyboard 318, a fixed disk drive 320, a floppy disk drive 322 operative to receive a floppy disk 324, and a CD-ROM player 326 operative to receive a CD-ROM 328. Many other devices can be connected, such as a pointing device 330 (e.g., a mouse) connected via serial port 314 and a modem 332 connected via serial port 316. Modem 332 may provide a direct connection to a server via a telephone link or to the Internet via a POP (point of presence). Alternatively, a network interface adapter 334 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 3 to be present to practice the present invention, as discussed below. Furthermore, the devices and subsystems may be interconnected in different ways from that shown in FIG. 3. The operation of a computer system such as that shown in FIG. 3 is readily known in the art and is not discussed in detail in this application, so as not to overcomplicate the present discussion. Code to implement the present invention may be operably disposed in system memory 306 or stored on storage media such as fixed disk 320, floppy disk 324 or CD-ROM 328.

Figure 4:
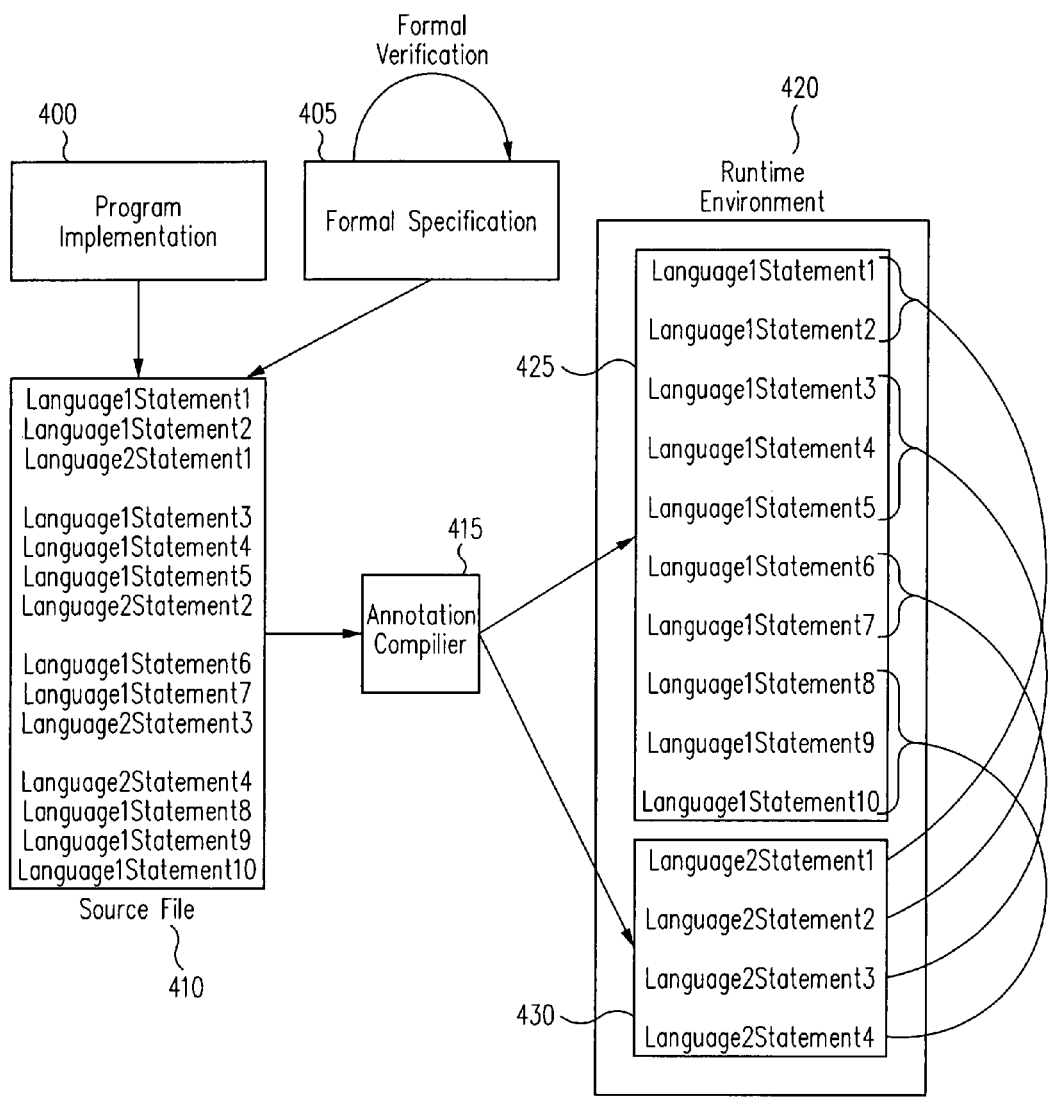
FIG. 4 is a block diagram that illustrates run-time verification of annotated software code in accordance with one embodiment of the present invention.

Turning now to FIG. 4, a block diagram that illustrates run-time verification of annotated software code in accordance with one embodiment of the present invention is presented. As shown in FIG. 4, a program implementation 400 written using a first computer language and the corresponding formal specification 405 written using a second computer language are combined to create a source file 410. The source file 410 includes statements written using the first computer language. The source file 410 is also interspersed with statements written using the second computer language. An annotation compiler 415 receives the source file 410 and creates two programs, with links between them. A first program 425 includes program implementation statements written in the first computer language and a second program 430 includes formal specification statements written in the second computer language.

Programming languages have constructs for introducing a new variable and for describing which occurrences of the variable in the rest of the program refer to the particular variable. Scoping rules provide a unique reference for variables in a program. Thus if a variable is used several times, a programmer can resolve which variable is really meant and can determine the current value of the variable. For example, in the ISO/ANSI draft standard version of C++ a loop header may introduce a new loop variable and its scope:

for(int i=0; i<NumOfElements; i++) {loop body};

The scope of the variable "i" in the above example is the program text following the "=" all the way to the end of the loop body. If the loop contains a break construct and if the loop is followed by some statement like printf("the index where we stopped searching is % d\n", i);

then it is known from the scoping rules that the program probably contains an error. Since the "i" in the call to printf does not refer to the "i" that was introduced as the loop variable but to some "i" that was declared elsewhere, it is unlikely that the value of "i" in the call to printf is that of the loop index when the loop was terminated. Scoping rules for other programming languages are well known and will not be discussed further herein to prevent obsfucation of the present invention.

According to one embodiment of the present invention, the formal specification statements apply the scoping rules used by the implementation statements. By way of example, if variable "B" in package "A" is specified as "B.A" in the program implementation statements, the corresponding variable in the program verification environment is referred to in a similar manner (i.e. "B.A", "B-A", "B:A", or the like). Applying the scoping rules used by the implementation statements provides a relatively simple mechanism by which a unique reference to a variable used by implementation statements is matched with the corresponding variable in the program verification environment.

According to one embodiment of the present invention, the formal specification is written using a functional computer language. Exemplary functional computer languages include, by way of example, the Miranda™ programming language, available from Research Software Ltd. of Canterbury, England, and the Prolog programming language.

Figure 5:
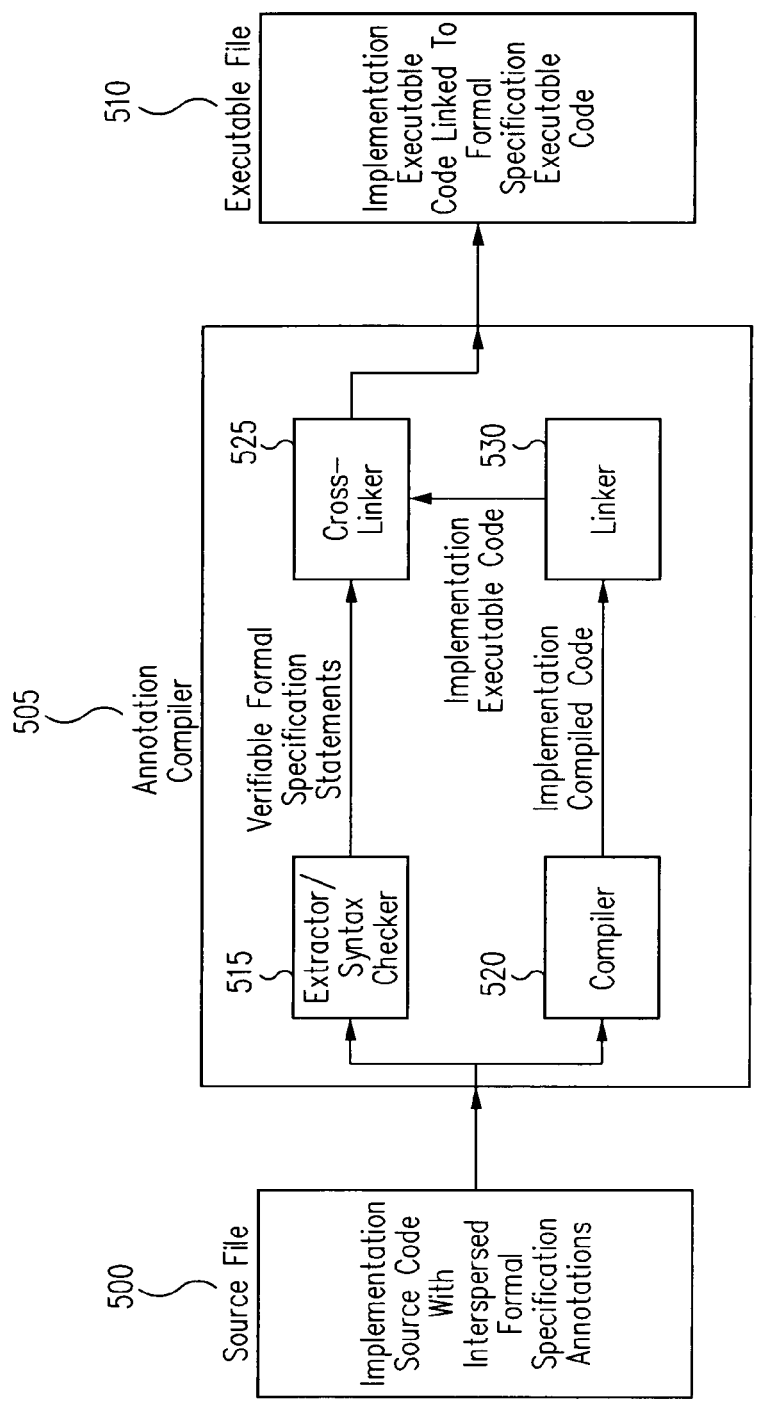
FIG. 5 is a block diagram that illustrates an annotation compiler in accordance with one embodiment of the present invention.

Turning now to FIG. 5, a block diagram that illustrates an annotation compiler in accordance with one embodiment of the present invention is presented. FIG. 5 provides more detail for reference numeral 415 of FIG. 4. A source file 500 includes implementation source code interspersed with formal specification annotations. An annotation compiler 505 includes an extractor/syntax checker 515, a compiler 520, a linker 530 and a cross-linker 525. Extractor/syntax checker 515 extracts formal specification annotations from source file 500 and presents the specification annotations to cross-linker 525. Compiler 520 compiles implementation source code in source file 500 and presents the compiled code to linker 530. Linker 530 receives the compiled code and resolves references between compiled source code modules to create implementation executable code. Cross-linker 525 receives the verifiable formal specification statements and implementation executable code and resolves references between the verifiable formal specification statements and the executable code to create an executable file containing implementation executable code linked to formal specification executable code. The implementation executable code and the formal specification executable code are linked such that results obtained by executing the implementation executable code are compared with results obtained by executing the corresponding formal specification executable code.

Figure 6:
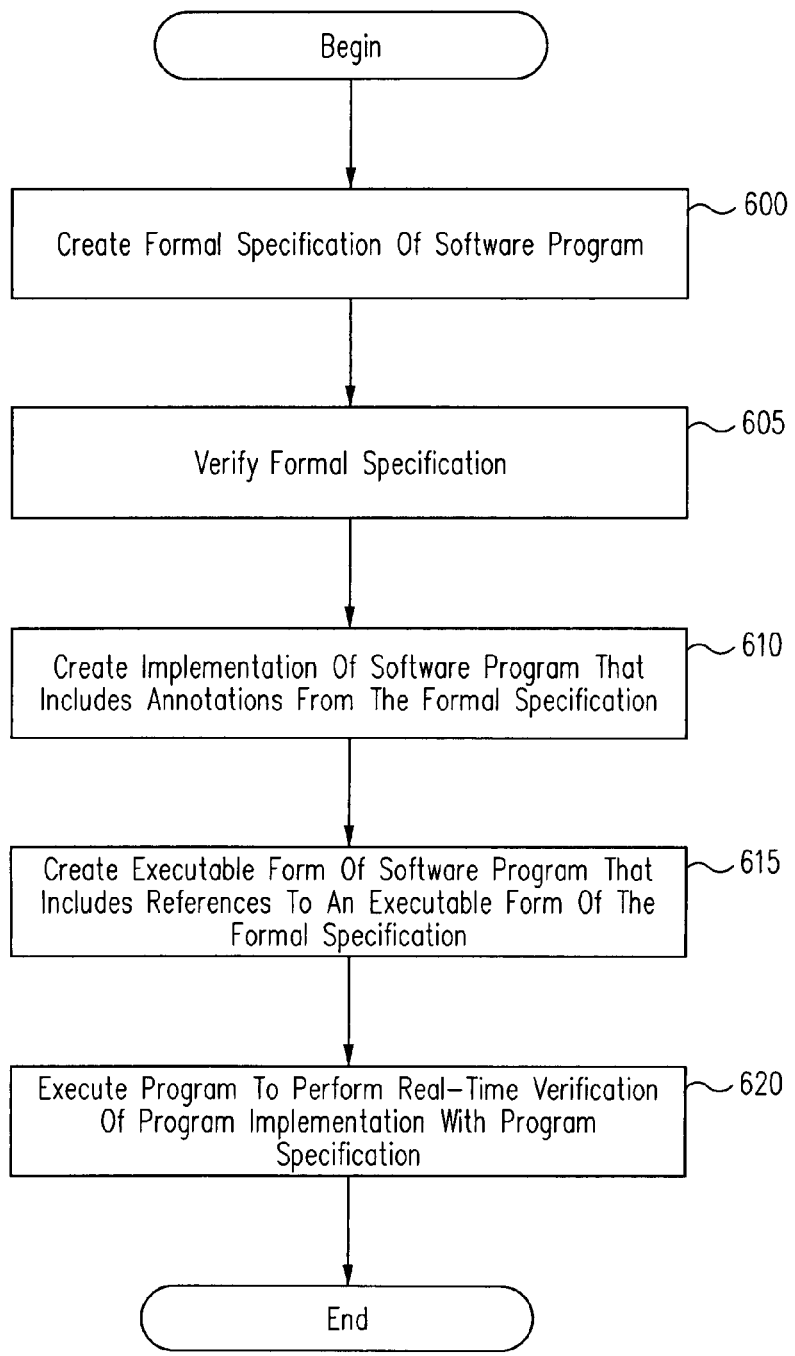
FIG. 6 is a flow diagram that illustrates a method for real-time verification of annotated software code in accordance with one embodiment of the present invention.

Turning now to FIG. 6, a flow diagram that illustrates a method for real-time verification of annotated software code in accordance with one embodiment of the present invention is presented. At 600, a formal specification of a software program is created. The formal specification may be created by a user. The formal specification may also be created by a tool, based at least in part on input from the user. The formal specification may also be based at least in part on a program implementation, such as when a user begins program development by writing a program implementation, but later determines a formal specification is needed. At 605, the formal specification is verified. The verification may be performed via visual inspection of the formal specification. The verification may also be performed via a verification program that receives the formal specification and produces a report listing the verification results. The verification program may also produce an implementation of the software program that includes annotations from the formal specification.

Still referring to FIG. 6, at 610 an implementation of a software program that includes annotations from the formal specification is created. The implementation may comprise one or more files. Also, the annotations may be denoted by any identifier. According to one embodiment of the present invention, the annotations are denoted using the same mechanism to denote program comments. By way of example, if a programming language defines the "!" character as denoting the rest of a line in a file as a comment, the "!" embodiments of the present invention may use the "!" character to indicate the rest of the line is an annotation from a formal specification. According to another embodiment of the present invention, an identifier that differs from the comment character is used to denote an annotation. By way of example the identifier "!F" may be used to indicate the rest of a line is an annotation. At 615, an executable form of a software program that includes references to an executable form of the formal specification is created. The references may comprise one or more absolute memory addresses. The references may also comprise one or more relative addresses. At 620, the program is executed to perform real-time verification of the program implementation with the program specification. The program may be executed on a target processor. The program may also be executed on a host computer configured to emulate the environment of a target processor.

The method illustrated by FIG. 6 shows an idealized sequence of events proceeding from the creation of a formal specification (600) to the execution of a program that performs real-time verification of a program implementation with a program specification (620). Program development may begin later than that illustrated by FIG. 6. By way of example, program development may begin with creating a software program implementation (610), with the creation of a formal specification (600) and the verification of the formal specification occurring later.

Additionally, program development may proceed in an iterative fashion, with incremental steps forward in the process illustrated by FIG. 6 until a determination is made that problem manifested in a later process can or should be corrected in an earlier process. At this point, program development continues at the earlier process and continues moving incrementally forward. By way of example, processes 600 and 605 may be repeated multiple times until the formal specification has achieved a particular level of maturity. As a further example, program development may proceed to process 620, regress back to an earlier process such as processes 600, 605, 610 or 615, and then move incrementally forward. Those of ordinary skill in the art will recognize that other sequences of program development are possible.

Figure 7:
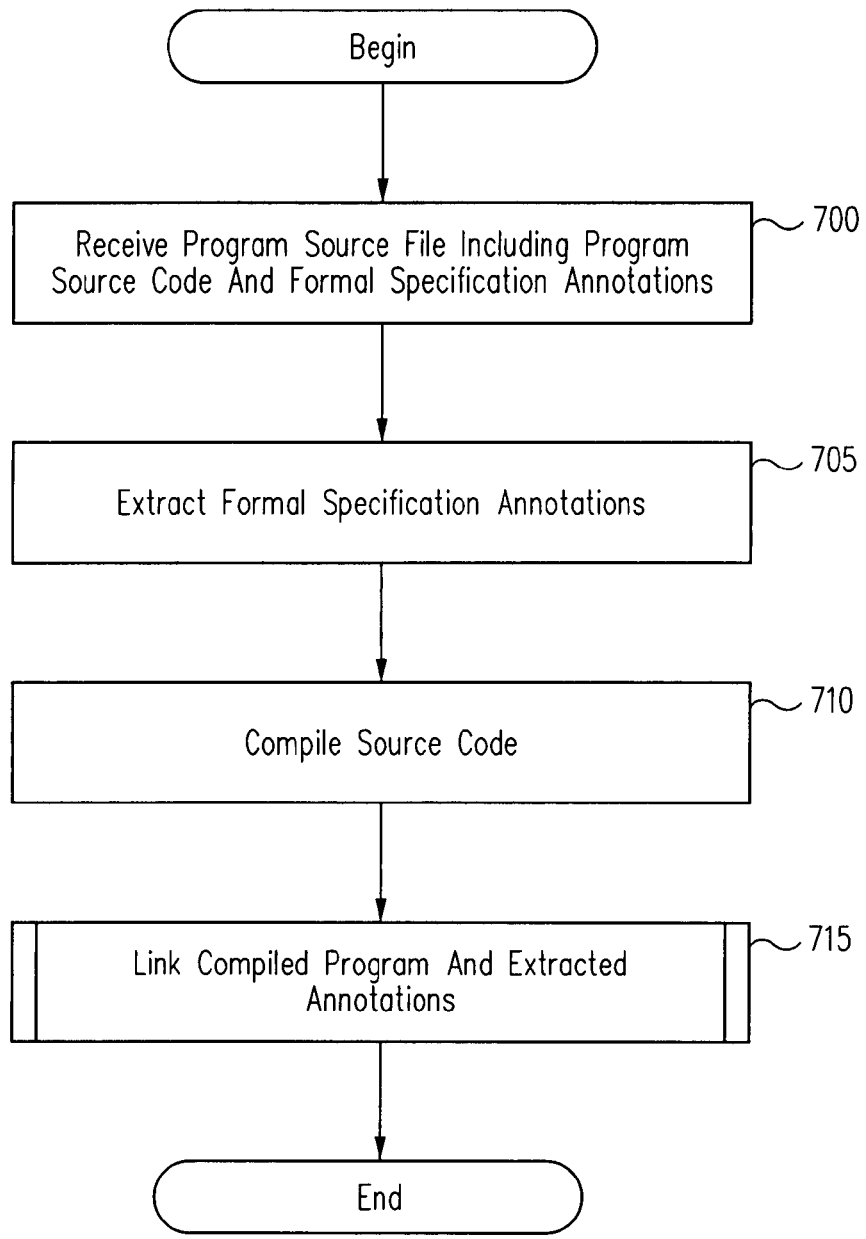
FIG. 7 is a flow diagram that illustrates a method for creating an executable form of a software program that includes references to an executable form of a formal specification in accordance with one embodiment of the present invention.

Turning now to FIG. 7, a flow diagram that illustrates a method for creating an executable form of a software program that includes references to an executable form of a formal specification in accordance with one embodiment of the present invention is presented. At 700, a program source file including program source code and corresponding formal specification annotations is received. The received program source file may be created by a verification program as described above with reference to FIG. 6. At 705, the formal specification annotations are extracted. The annotations may be extracted by parsing the program source file to identify which portions of the file comprise the program source file and which portions of the file comprise formal specification annotations. At 710, the source code is compiled. The source code may be compiled with or without various compiler options. For example, the source code may be compiled with or without "debug information" that facilitates debugging the program. At 715, the compiled program and the extracted annotations are linked. This is described in more detail below, with reference to FIG. 8.

Figure 8:
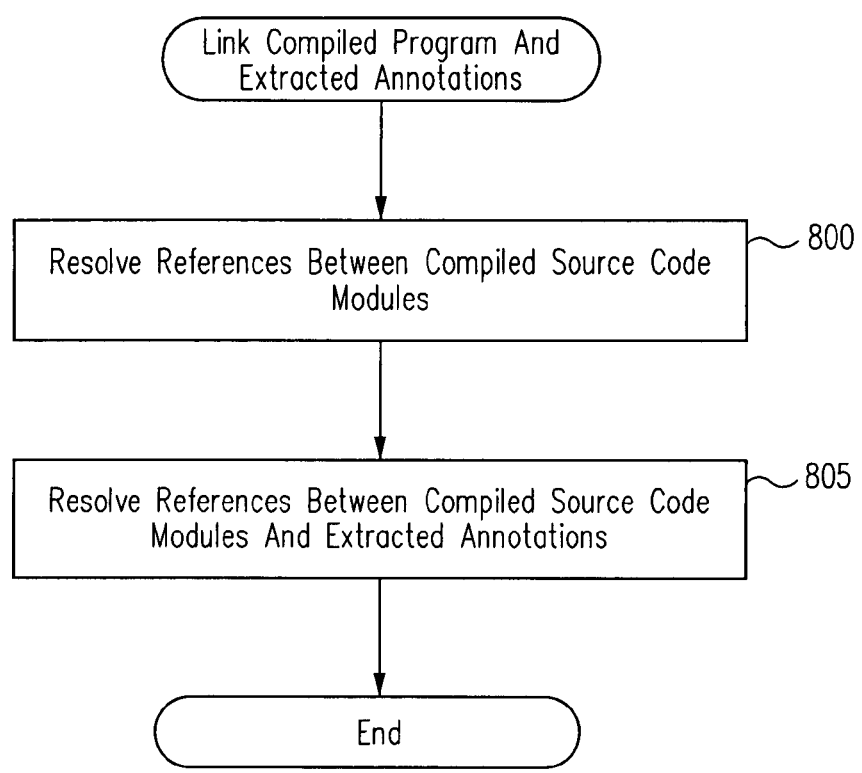
FIG. 8 is a flow diagram that illustrates a method for linking a compiled program with formal specification annotations extracted from a source file in accordance with one embodiment of the present invention.

Turning now to FIG. 8, a flow diagram that illustrates a method for linking a compiled program with formal specification annotations extracted from a source file in accordance with one embodiment of the present invention is presented. FIG. 8 provides more detail for reference numeral 715 of FIG. 7. At 800, references between compiled source code modules are resolved. The references may be to individual modules, or modules within a library of modules. At 805, references between compiled source code modules and extracted annotations are resolved. The result of process 805 is an executable program including at least one reference to an executable formal specification module. According to one embodiment of the present invention, references between compiled source code modules and extracted annotations are resolved by inserting a "conformance" instruction in the compiled source code modules after the last instruction that corresponds to an extracted annotation. A virtual machine is configured to execute a corresponding formal specification module upon receiving a conformance instruction. The correspondence may be established by naming an executable formal specification module based at least in part on the address of the conformance instruction.

According to embodiments of the present invention, the usual function of an executable program implementation instruction is replaced with the function of a conformance instruction. A "NOP" (No Operation) and a "BREAK" instruction are two examples of such instructions. A NOP instruction is a command given to the CPU that has no effect on the CPU state. A NOP instruction is sometimes used as a tool to control timing-sensitive tasks. According to one embodiment of the present invention, a conformance instruction comprises a "NOP" (No Operation) instruction. A BREAK instruction is a command given to the CPU that causes the CPU to enter a system mode, such as a "Debug" mode. According to another embodiment of the present invention, a conformance instruction comprises a "BREAK" instruction. Those of ordinary skill in the art will recognize that other executable program implementation instructions may be used.

Figure 9:
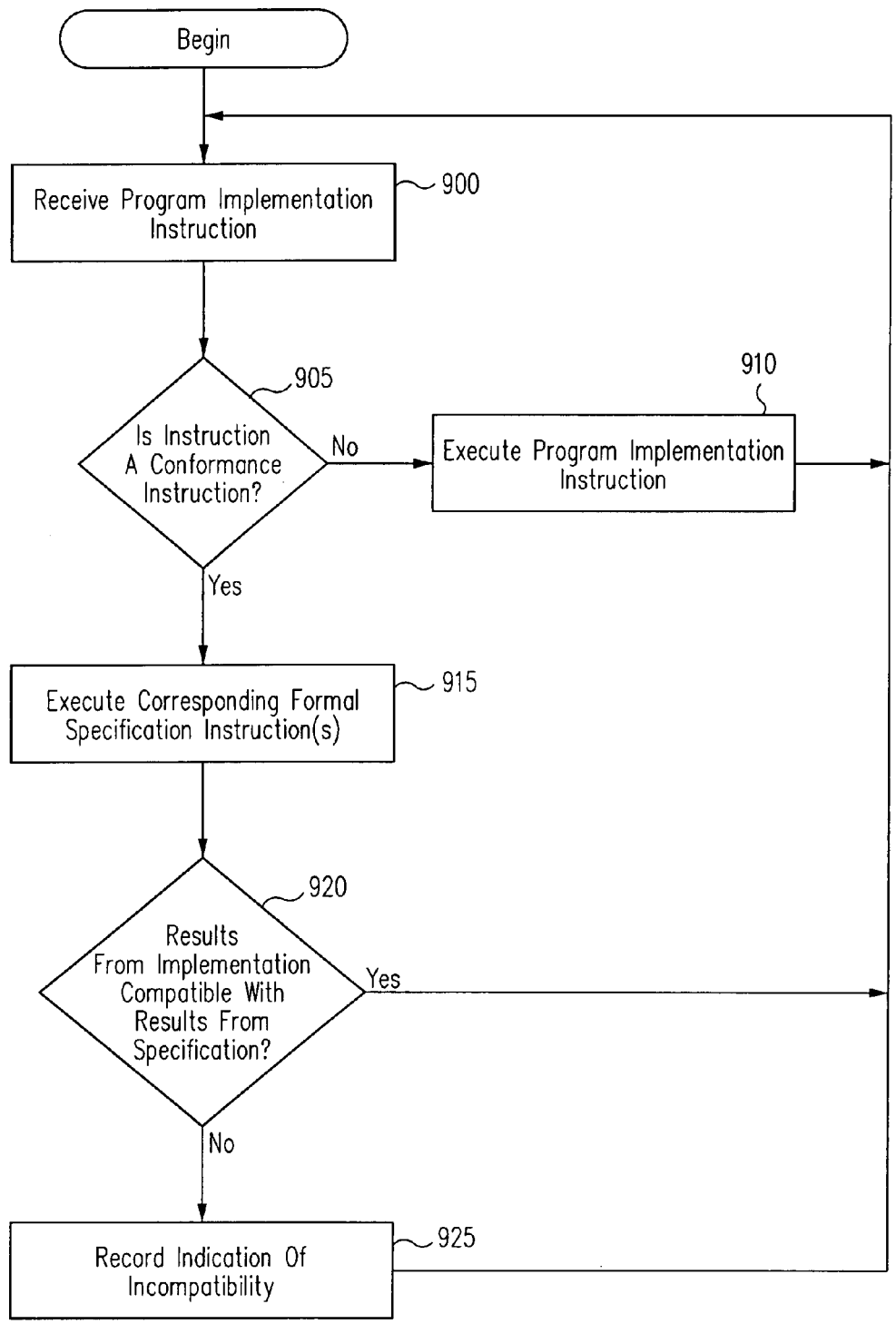
FIG. 9 is a flow diagram that illustrates a method for executing a program including references to a formal specification in accordance with one embodiment of the present invention.

Turning now to FIG. 9, a flow diagram that illustrates a method for executing a program including references to a formal specification in accordance with one embodiment of the present invention is presented. At 900, a program implementation instruction is received. The program implementation instruction may be one instruction in an instruction stream to be executed on a processor. At 905, a determination is made regarding whether the instruction is a conformance instruction. If the instruction is not a conformance instruction, the process continues with another program implementation instruction at 900. If the instruction is a conformance instruction, the corresponding formal specification instructions are executed at 915. According to one embodiment of the present invention, the corresponding formal specification instructions are executed by a virtual machine that is separate from the virtual machine executing program implementation instructions. At 920, a determination is made regarding whether the results from executing the program implementation instruction are compatible with the results from executing the corresponding formal specification instructions. If the results are incompatible, an indication of incompatibility is recorded at 925. The recordation of incompatibility may include rendering to a user an indication of incompatibility. By way of example, a user may receive a message such as "Program Implementation is Incompatible with Formal Specification", or the like. If the program implementation executes to completion without an indication of incompatibility, an indication that the program implementation conforms to the specification is made. The indication may be recorded in a memory. Additionally, the indication may be rendered to a user. By way of example, a user may receive a message such as "Program Implementation is Compatible with Formal Specification", or the like.

Figure 10:
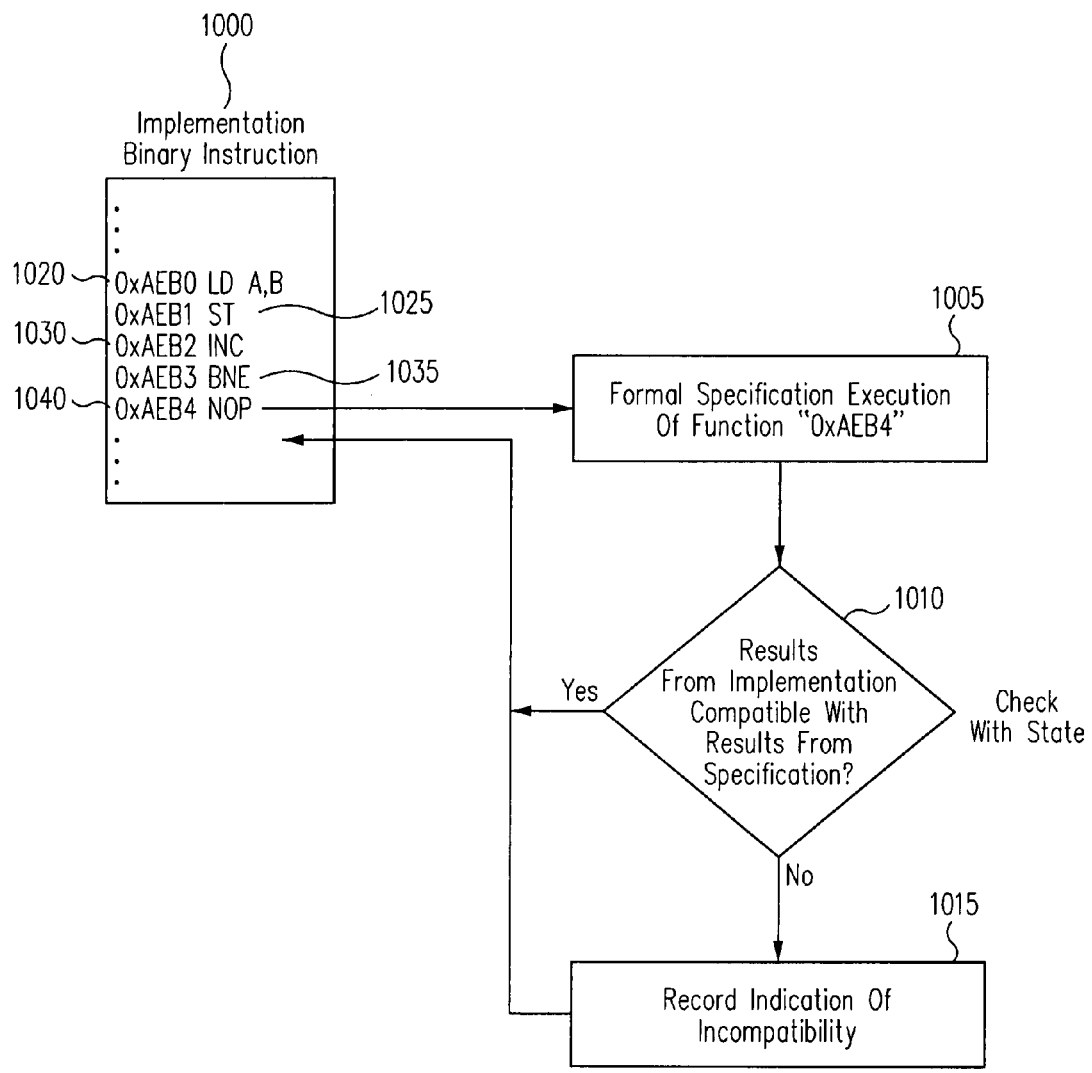
FIG. 10 is a block diagram that illustrates determining the name of an executable formal specification function to call based on the value of a current program counter in accordance with one embodiment of the present invention.

Turning now to FIG. 10, a block diagram that illustrates determining the name of an executable formal specification function to call based on the value of a current program counter in accordance with one embodiment of the present invention is presented. Reference numeral 1000 represents the instruction stream of an implementation. An annotation compiler inserts the conformance instruction associated with program counter value AEB4 (1040) into the instruction stream as a means of synchronizing the implementation program with a corresponding executable formal specification module. A cross-linker (reference numeral 525 of FIG. 5) names an executable formal specification module based on the program counter value. The formal specification module may be obtained from a directory or library of formal specification modules.

Still referring to FIG. 10, execution of the conformance instruction triggers a processor, such as a virtual machine, to invoke an executable formal specification module having a name that corresponds to the current program counter value. As illustrated in FIG. 10, the program counter value associated with the conformance instruction is the value AEB4 (1040). Thus, an executable formal specification module named "AEB4" is invoked. At 1010, a determination is made regarding whether the results of executing the formal specification module is compatible with the results obtained by executing the implementation. For example, if the implementation assigns a value of "10" to variable "A" and the corresponding formal specification module indicates variable "A" must be less than "5", the results are incompatible. If the results are incompatible, an indication of incompatibility is recorded at 1015. Execution of the implementation program continues with the instruction following the conformance instruction 1040.

Figure 11:
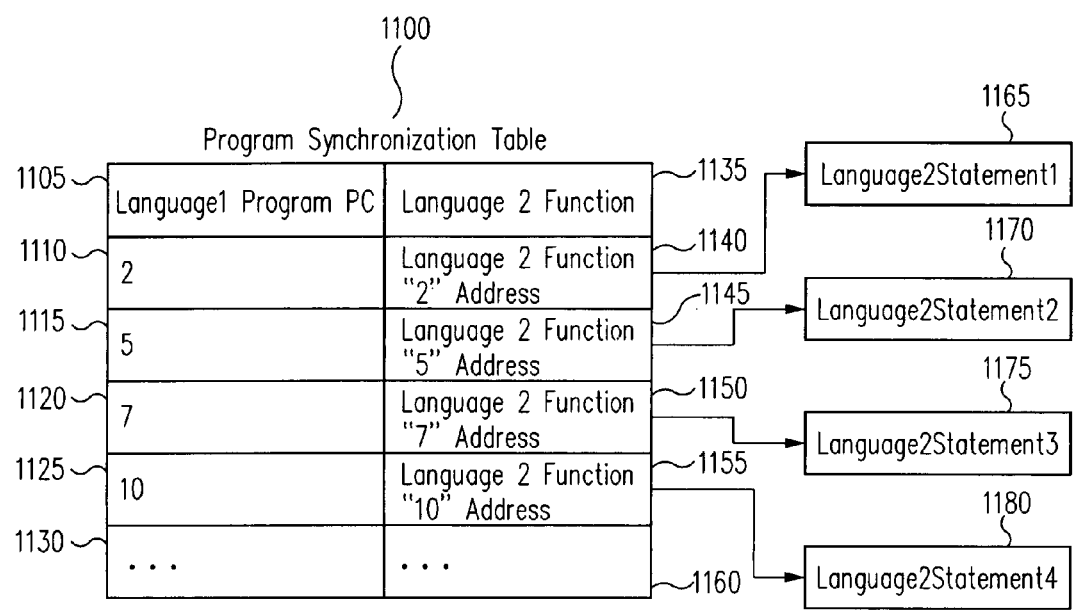
FIG. 11 is a block diagram that illustrates a program synchronization table in accordance with one embodiment of the present invention.

Turning now to FIG. 11, a block diagram that illustrates a program synchronization table in accordance with one embodiment of the present invention is presented. Program synchronization table 1100 includes at least one entry that associates a program counter for a first computer language program with a corresponding executable formal specification module address. As shown in FIG. 11, first computer language program counter values of 2 (1110), 5 (1115), 7 (1120) and 10 (1125) are associated with executable formal specification modules named "2" (1140), "5" (1145), "7" (1150) and "10" (1155), respectively. According to one embodiment of the present invention, a virtual machine is configured to use table 1100 to determine an executable formal specification module to call upon receiving a conformance instruction. According to another embodiment of the present invention, a virtual machine is configured to compare each received instruction with program counter values listed in table 1100 and to call the corresponding executable formal specification module if there is a match.

Figure 12:
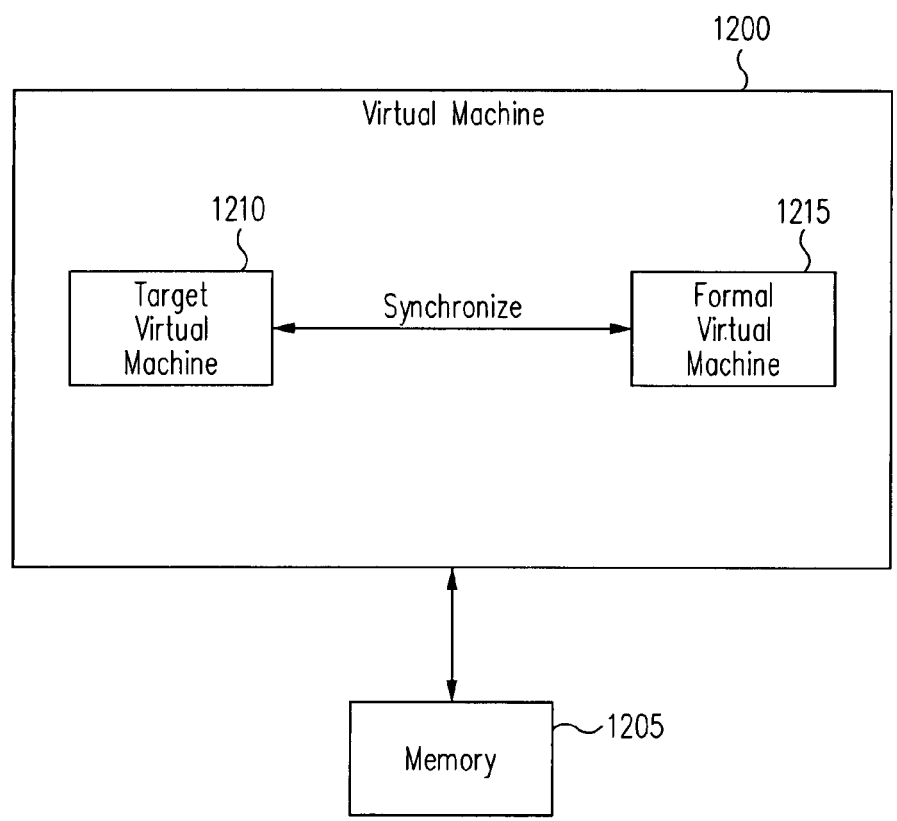
FIG. 12 is a block diagram that illustrates a virtual machine in accordance with one embodiment of the present invention.

Turning now to FIG. 12, a block diagram that illustrates a virtual machine in accordance with one embodiment of the present invention is presented. A virtual machine 1200 includes a target virtual machine 1210 for executing implementation instructions and a formal virtual machine 1215 for executing executable formal specification modules. According to one embodiment of the present invention, the implementation instructions executed by target virtual machine 1210 include at least one conformance instruction to indicate a corresponding executable formal specification module should be called. Target virtual machine 1210 and formal virtual machine 1215 may be synchronized via a program synchronization table as described with respect to FIG. 11.

Figure 13:
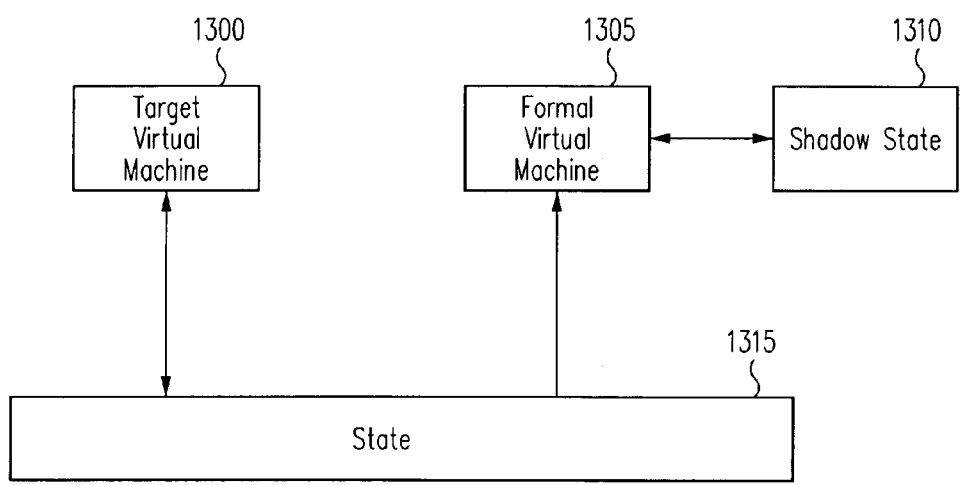
FIG. 13 is a block diagram that illustrates access of a target virtual machine and a formal virtual machine to state variables in accordance with one embodiment of the present invention.

Turning now to FIG. 13, a block diagram that illustrates access of a target virtual machine and a formal virtual machine to state variables in accordance with one embodiment of the present invention is presented. Target virtual machine 1300 has read access and write access to state 1315. Target virtual machine 1300 has no access to shadow state 1310. Formal virtual machine 1305 has read access to state 1315. Formal virtual machine 1300 also has read access and write access to shadow state 1310. In operation, target virtual machine executes implementation instructions, possibly modifying state 1315 as a result. Upon receiving a conformance instruction, target virtual machine 1300 invokes formal virtual machine 1305 which executes corresponding executable formal specification modules, possibly modifying shadow state 1310 as a result. If one or more result in state 1315 is inconsistent with the corresponding one or more result in shadow state 1310, an indication that the formal specification is incompatible with the program implementation is recorded.

Figure 14:
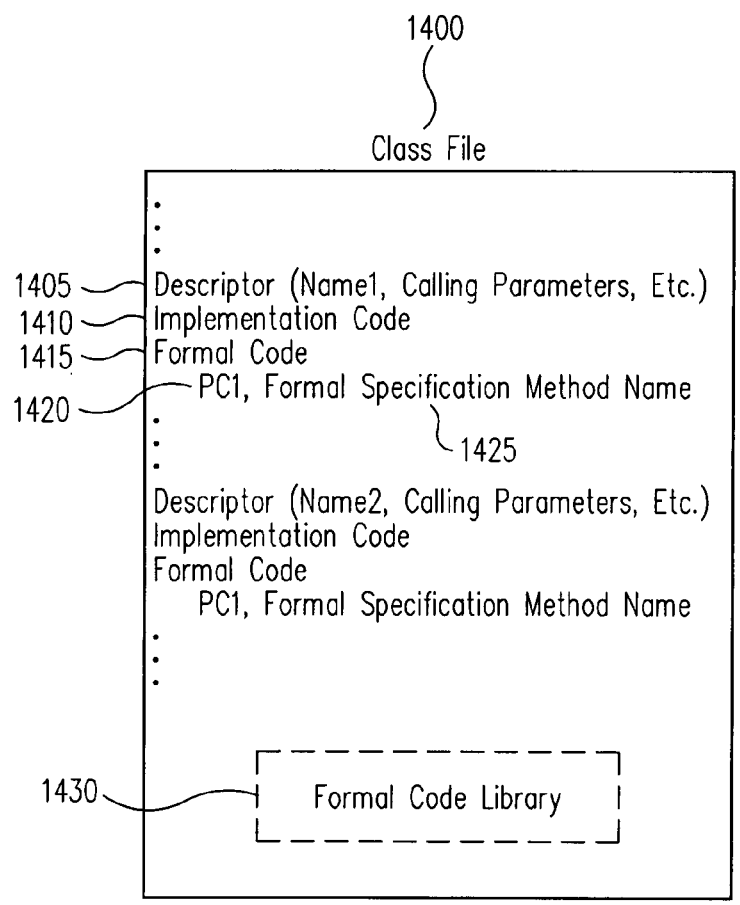
FIG. 14 is a block diagram that illustrates a class file having formal code collocated with associated Java™ method code in accordance with one embodiment of the present invention.
Figure 15:
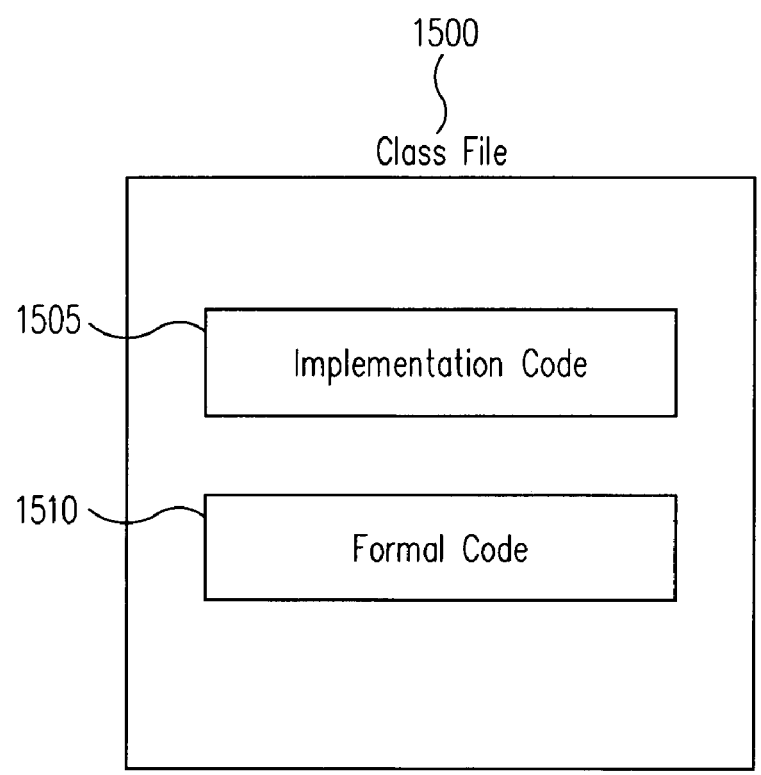
FIG. 15 is a block diagram that illustrates a class file having a formal code library in accordance with one embodiment of the present invention.

FIGS. 14 and 15 illustrate class file formats that include formal code associated with method code in accordance with embodiments of the present invention. FIG. 14 illustrates a class file having method code collocated with associated formal code, while FIG. 15 illustrates a class file having a separate formal code library.

Turning now to FIG. 14, a block diagram that illustrates a class file having formal code collocated with associated Java™ method code in accordance with one embodiment of the present invention is presented. Class file 1400 includes a formal code component 1415 that specifies executable formal specification code associated with implementation code component 1410. Formal code component 1415 includes a program counter indicator 1420 and a formal specification method name 1425. Formal specification method name 1425 indicates the name of an executable formal specification method to call when the target virtual machine program counter equals the value specified by program counter indicator 1420. Class file 1400 may also include a formal code library 1430 that is separate from the associated implementation code. Formal code library 1430 may be used to supplement the formal code 1415 collocated with implementation code 1415.

Turning now to FIG. 15, a block diagram that illustrates a class file having a formal code library in accordance with one embodiment of the present invention is presented. Class file 1500 includes a formal code library 1510 that specifies executable formal specification code associated with one or more implementation code portions (such as a method) collocated in class file 1500. The implementation code component 1505 may comprise at least one entry, each of which includes a method descriptor and implementation code corresponding to the method descriptor. The formal code component 1510 may include at least one entry, each of which includes a method descriptor and formal code corresponding to the method descriptor.

Figure 16:
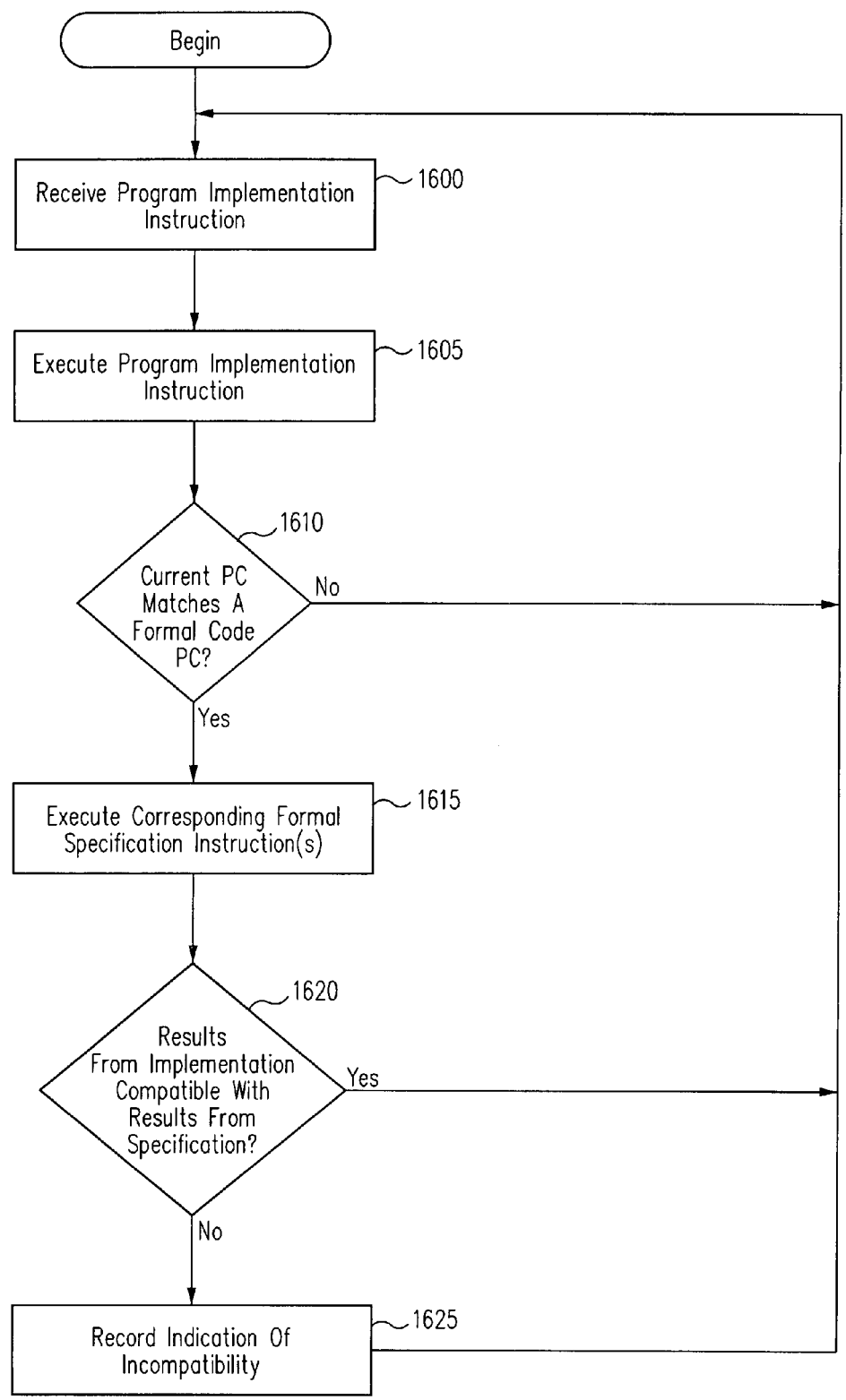
FIG. 16 is a flow diagram that illustrates a method for executing a program using the class file formats of FIGS. 14 and 15 in accordance with one embodiment of the present invention.

Turning now to FIG. 16, a flow diagram that illustrates a method for executing a program using the class file formats of FIGS. 14 and 15 in accordance with one embodiment of the present invention is presented. At 1600, a program implementation instruction is received. The program implementation instruction may be one instruction in an instruction stream to be executed on a processor. At 1605, the program implementation instruction is executed. At 1610, a determination is made regarding whether the current program counter matches a formal code program counter (reference numeral 1420 of FIG. 14). If the current program counter does not match a formal code program counter, processing of the next program implementation instruction proceeds at 1600. If the current program counter matches a formal code program counter, at 1615 the corresponding formal specification instructions are executed. According to one embodiment of the present invention, the corresponding formal specification instructions are executed by a virtual machine that is separate from the virtual machine executing program implementation instructions. At 1620, a determination is made regarding whether the results from executing the program implementation are compatible with the results of executing the corresponding formal specification instructions. If the results are compatible, processing of the next program implementation instruction proceeds at 1600. If the results are not compatible, an indication of incompatibility is recorded at 1625. The recordation of incompatibility may include rendering to a user an indication of incompatibility. By way of example, a user may receive a message such as "Program Implementation is Incompatible with Formal Specification", or the like. If the program implementation executes to completion without an indication of incompatibility, an indication that the program implementation conforms to the specification is made. The indication may be recorded in a memory. Additionally, the indication may be rendered to a user. By way of example, a user may receive a message such as "Program Implementation is Compatible with Formal Specification", or the like.

According to one embodiment of the present invention, a switch setting determines whether a virtual machine performs run-time verification of annotated software code. If the setting indicates run-time verification of annotated software code should be performed, the virtual machine uses formal code provided in class files (reference numerals 1415 and 1430 of FIG. 14, reference numeral 1510 of FIG. 15) to perform run-time verification of the implementation code (reference numeral 1410 of FIG. 14, reference numeral 1505 of FIG. 15). If the setting indicates run-time verification of annotated software code should not be performed, the virtual machine ignores any formal code in class files. Additionally, conformance instructions in the implementation code are ignored as well.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for software development comprising:
   creating a formal specification of a software program;
   verifying said formal specification;
   creating an executable form of said formal specification;
   creating an implementation of said software program, said implementation including program source code and at least one annotation from said formal specification wherein said implementation of said software program is different from said formal specification;
   creating an executable program based on said implementation of said software program, said executable program including at least one reference to said executable form of said formal specification,
      wherein said creating an executable program includes:
         receiving said implementation including program source code and at least one annotation from said formal specification by an annotation compiler including an extractor/syntax checker; a compiler; a linker; and a cross-linker;
         extracting, by said extractor/syntax checker, said at least one annotation from said implementation;
         presenting, by said extractor/syntax checker, said at least one annotation to said cross-linker;
         compiling, by said compiler, said program source code to generate compiled code including compiled source code modules;
         presenting, by said compiler, said compiled code to said linker;
         resolving, by said linker, references between said compiled source code modules to generate implementation executable code;
         presenting, by said linker, said implementation executable code to said cross linker; and
         linking, by said cross linker, said implementation executable code and said at least one annotation to create said executable program including said implementation executable code linked to said executable form of said formal specification; and
      executing said executable program to perform real-time verification of said program implementation with said formal specification.

2. The method of claim 1 wherein said formal specification is written in a functional computer language.

3. The method of claim 2 wherein said functional computer language comprises the Miranda™ language.

4. The method of claim 2 wherein said functional computer language comprises the Prolog language.

5. A method for executing a program comprising:
   receiving a program implementation instruction;
   executing said program implementation instruction when said program implementation instruction is not a conformance instruction wherein said conformance instruction indicates one or more results from said executing said program implementation instruction should be compared with a result of executing an executable formal specification module associated with the conformance instruction wherein said formal specification is different from said program implementation;
   executing one or more formal specification instructions, in said executable formal specification module, corresponding to said program implementation instruction when said program implementation instruction is a conformance instruction; and
   recording an indication of incompatibility when the result of executing said program implementation instruction is incompatible with the result of executing said corresponding one or more formal specification instructions.

6. The method of claim 5, further comprising indicating said program conforms to said formal specification when said program executes to completion without said recording an indication of incompatibility.

7. The method of claim 5 wherein said conformance instruction comprises a "NOP" instruction.

8. The method of claim 5 wherein said conformance instruction comprises a "BREAK" instruction.

9. The method of claim 5 wherein said executing said one or more formal specification instructions further comprises determining which formal specification function to call based at least in part on the address of a conformance instruction.

10. The method of claim 5 wherein said formal specification is written in a functional computer language.

11. The method of claim 10 wherein said functional computer language comprises the Miranda™ language.

12. The method of claim 10 wherein said functional computer language comprises the Prolog language.

13. A method for software development comprising:
   step for creating a formal specification of a software program;
   step for verifying said formal specification;
   step for creating an executable form of said formal specification;
   step for creating an implementation of said software program, said implementation including program source code and at least one annotation from said formal specification wherein said implementation of said software program is different from said formal specification;
   step for creating an executable program based on said implementation of said software program, said executable program including at least one reference to said executable form of said formal specification,
      wherein said step for creating an executable program includes:
         step for receiving said implementation including program source code and at least one annotation from said formal specification by an annotation compiler including an extractor/syntax checker; a compiler; a linker; and a cross-linker;
         step for extracting, by said extractor/syntax checker, said at least one annotation from said implementation;
         step for presenting, by said extractor/syntax checker, said at least one annotation to said cross-linker;
         step for compiling, by said compiler, said program source code to generate compiled code including compiled source code modules;
         step for presenting, by said compiler, said compiled code to said linker;
         step for resolving, by said linker, references between said compiled source code modules to generate implementation executable code;
         step for presenting, by said linker, said implementation executable code to said cross linker; and step for linking, by said cross linker, said implementation executable code and said at least one annotation to create said executable program including said implementation executable code linked to said executable form of said formal specification; and step for executing said executable program to perform real-time verification of said program implementation with said formal specification.

14. The method of claim 13 wherein said formal specification is written in a functional computer language.

15. The method of claim 14 wherein said functional computer language comprises the Miranda™ language.

16. The method of claim 14 wherein said functional computer language comprises the Prolog language.

17. A method for executing a program comprising:
step for receiving a program implementation instruction;
step for executing said program implementation instruction when said program implementation instruction is not a conformance instruction wherein said conformance instruction indicates one or more results from said executing said program implementation instruction should be compared with a result of executing an executable formal specification module associated with the conformance instruction wherein said formal specification is different from said program implementation;
step for executing one or more formal specification instructions, in said executable formal specification module, corresponding to said program implementation instruction when said program implementation instruction is a conformance instruction; and
step for recording an indication of incompatibility when the result of executing said program implementation instruction is incompatible with the result of executing said corresponding one or more formal specification instructions.

18. The method of claim 17, further comprising step for indicating said program conforms to said formal specification when said program executes to completion without said recording an indication of incompatibility.

19. The method of claim 17 wherein said conformance instruction comprises a "NOP" instruction.

20. The method of claim 17 wherein said conformance instruction comprises a "BREAK" instruction.

21. The method of claim 17 wherein said step for executing said one or more formal specification instructions further comprises step for determining which formal specification function to call based at least in part on the address of a conformance instruction.

22. The method of claim 17 wherein said formal specification is written in a functional computer language.

23. The method of claim 22 wherein said functional computer language comprises the Miranda™ language.

24. The method of claim 22 wherein said functional computer language comprises the Prolog language.

25. A program storage device readable by a machine, embodying a program of instructions executable by the machine to perform a method for software development, the method comprising:
creating a formal specification of a software program;
verifying said formal specification;
creating an executable form of said formal specification;
creating an implementation of said software program, said implementation including program source code and at least one annotation from said formal specification wherein said implementation of said software program is different from said formal specification;
creating an executable program based on said implementation of said software program, said executable program including at least one reference to said executable form of said formal specification,
wherein said creating an executable program includes:
receiving said implementation including program source code and at least one annotation from said formal specification by an annotation compiler including an extractor/syntax checker; a compiler; a linker; and a cross-linker;
extracting, by said extractor/syntax checker, said at least one annotation from said implementation;
presenting, by said extractor/syntax checker, said at least one annotation to said cross-linker;
compiling, by said compiler, said program source code to generate compiled code including compiled source code modules;
presenting, by said compiler, said compiled code to said linker;
resolving, by said linker, references between said compiled source code modules to generate implementation executable code;
presenting, by said linker, said implementation executable code to said cross linker; and
linking, by said cross linker, said implementation executable code and said at least one annotation to create said executable program including said implementation executable code linked to said executable form of said formal specification; and
executing said executable program to perform real-time verification of said program implementation with said formal specification.

26. The program storage device of claim 25 wherein said formal specification is written in a functional computer language.

27. The program storage device of claim 26 wherein said functional computer language comprises the Miranda™ language.

28. The program storage device of claim 26 wherein said functional computer language comprises the Prolog language.

29. A program storage device readable by a machine, embodying a program of instructions executable by the machine to perform a method for executing a program, the method comprising:
receiving a program implementation instruction;
executing said program implementation instruction when said program implementation instruction is not a conformance instruction wherein said conformance instruction indicates one or more results from said executing said program implementation instruction should be compared with a result of executing an executable formal specification module associated with the conformance instruction wherein said formal specification is different from said program implementation;
executing one or more formal specification instructions, in said executable formal specification module, corresponding to said program implementation instruction when said program implementation instruction is a conformance instruction; and
recording an indication of incompatibility when the result of executing said program implementation instruction is incompatible with the result of executing said corresponding one or more formal specification instructions.

30. The program storage device of claim 29 wherein said method further comprises indicating said program conforms to said formal specification when said program executes to completion without said recording an indication of incompatibility.

31. The program storage device of claim 29 wherein said conformance instruction comprises a "NOP" instruction.

32. The program storage device of claim 29 wherein said conformance instruction comprises a "BREAK" instruction.

33. The program storage device of claim 29 wherein said executing said one or more formal specification instructions further comprises determining which formal specification function to call based at least in part on the address of a conformance instruction.

34. The program storage device of claim 29 wherein said formal specification is written in a functional computer language.

35. The program storage device of claim 34 wherein said functional computer language comprises the Miranda™ language.

36. The program storage device of claim 34 wherein said functional computer language comprises the Prolog language.

37. An apparatus for software development comprising:
means for creating a formal specification of a software program;
means for verifying said formal specification;
means for creating an executable form of said formal specification;
means for creating an implementation of said software program, said implementation including program source code and at least one annotation from said formal specification wherein said implementation of said software program is different from said formal specification;
means for creating an executable program based on said implementation of said software program, said executable program including at least one reference to said executable form of said formal specification,
wherein said means for creating an executable program includes:
means for receiving said implementation including program source code and at least one annotation from said formal specification by an annotation compiler including an extractor/syntax checker; a compiler; a linker; and a cross-linker;
means for extracting, by said extractor/syntax checker, said at least one annotation from said implementation;
means for presenting, by said extractor/syntax checker, said at least one annotation to said cross-linker;
means for compiling, by said compiler, said program source code to generate compiled code including compiled source code modules;
means for presenting, by said compiler, said compiled code to said linker;
means for resolving, by said linker, references between said compiled source code modules to generate implementation executable code;
means for presenting, by said linker, said implementation executable code to said cross linker; and
means for linking, by said cross linker, said implementation executable code and said at least one annotation to create said executable program including said implementation executable code linked to said executable form of said formal specification; and
means for executing said executable program to perform real-time verification of said program implementation with said formal specification.

38. The apparatus of claim 37 wherein said formal specification is written in a functional computer language.

39. The apparatus of claim 38 wherein said functional computer language comprises the Miranda™ language.

40. The apparatus of claim 38 wherein said functional computer language comprises the Prolog language.

41. An apparatus for executing a program comprising:
means for receiving a program implementation instruction;
means for executing said program implementation instruction when said program implementation instruction is not a conformance instruction wherein said conformance instruction indicates one or more results from said executing said program implementation instruction should be compared with a result of executing an executable formal specification module associated with the conformance instruction wherein said formal specification is different from said program implementation;
means for executing one or more formal specification instructions, in said executable formal specification module, corresponding to said program implementation instruction when said program implementation instruction is a conformance instruction; and
means for recording an indication of incompatibility when the result of executing said program implementation instruction is incompatible with the result of executing said corresponding one or more formal specification instructions.

42. The apparatus of claim 41, further comprising means for indicating said program conforms to said formal specification when said program executes to completion without said recording an indication of incompatibility.

43. The apparatus of claim 41 wherein said conformance instruction comprises a "NOP" instruction.

44. The apparatus of claim 41 wherein said conformance instruction comprises a "BREAK" instruction.

45. The apparatus of claim 41 wherein said means for executing said one or more formal specification instructions further comprises means for determining which formal specification function to call based at least in part on the address of a conformance instruction.

46. The apparatus of claim 41 wherein said formal specification is written in a functional computer language.

47. The apparatus of claim 46 wherein said functional computer language comprises the Miranda™ language.

48. The apparatus of claim 46 wherein said functional computer language comprises the Prolog language.

49. An apparatus for real-time verification of a program, comprising:
a first memory for storing data for said program;
a second memory for storing state data regarding verification of said program;
a target virtual machine for executing one or more instructions of said program, said target virtual machine capable of reading from and writing to said first memory; and
a formal virtual machine for executing one or more instructions of a second computer language, said formal virtual machine capable of reading said first memory, said formal virtual machine capable of reading from and writing to said second memory.

50. The apparatus of claim 49 wherein
said target virtual machine comprises a Java Card™ virtual machine; and
said formal virtual machine comprises a formal model of a Java Card™ virtual machine.

51. The apparatus of claim 49 wherein
said target virtual machine comprises a Java™ Virtual Machine; and
said formal virtual machine comprises a formal model of a Java™ Virtual Machine.

* * * * *